March 8, 1960 R. E. HARRINGTON ET AL 2,927,652
TRACTOR MOUNTED CULTIVATOR
Filed Jan. 22, 1957 3 Sheets-Sheet 3
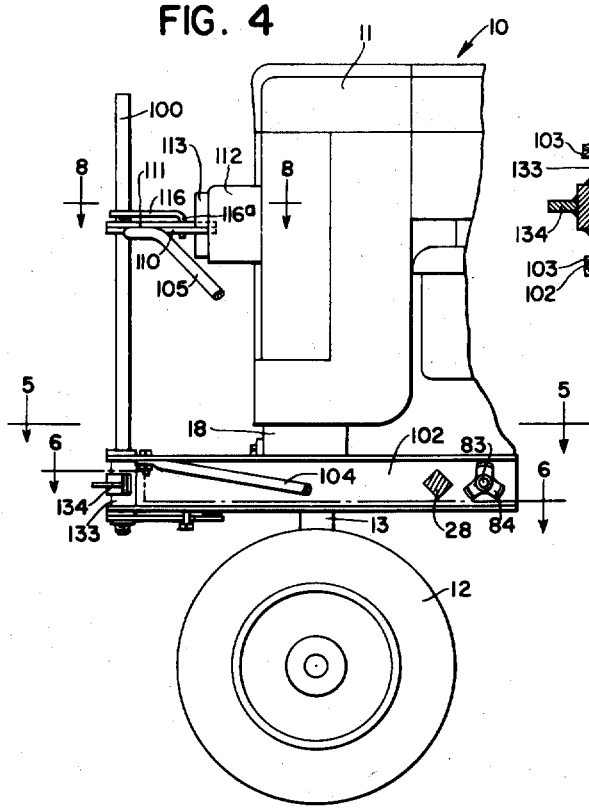
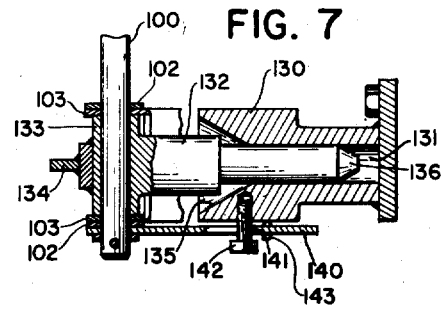
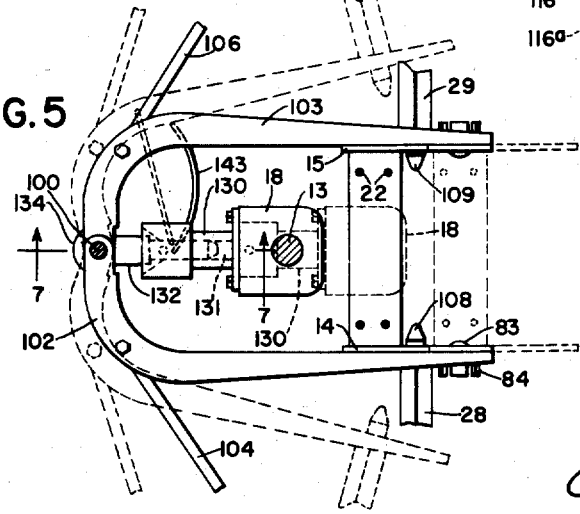
INVENTORS
R. E. HARRINGTON &
B. M. SILVERBERG

United States Patent Office 2,927,652
Patented Mar. 8, 1960

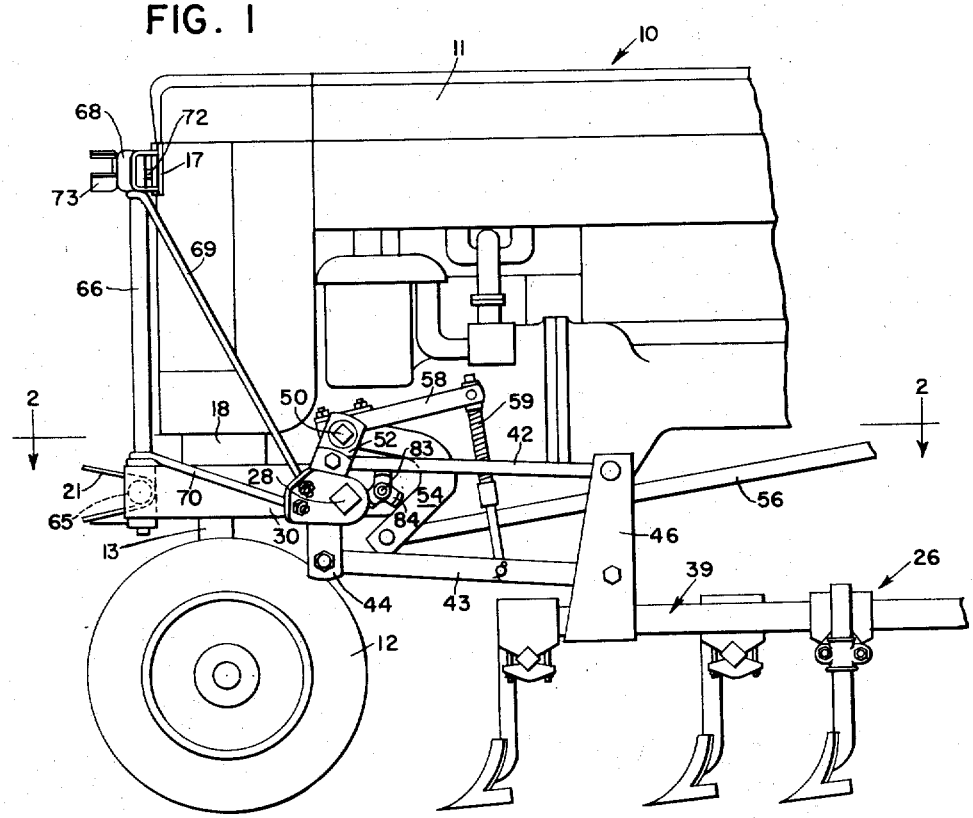

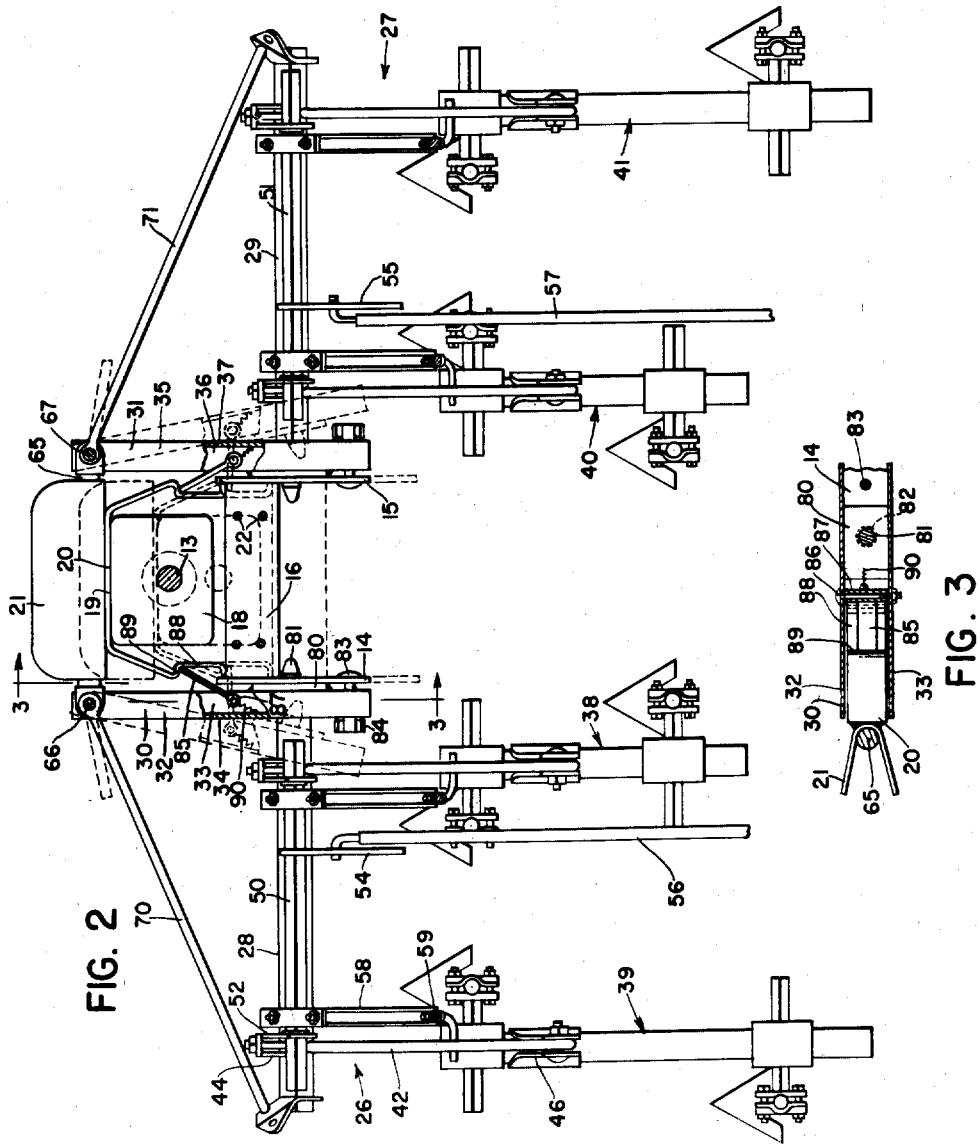

2,927,652

TRACTOR MOUNTED CULTIVATOR

Roy E. Harrington, Moline, Ill., and Bernard M. Silverberg, Milwaukee, Wis., assignors, by mesne assignments, to Deere & Company, a corporation of Delaware Application January 22, 1957, Serial No. 635,523

15 Claims. (Cl. 172—273)

This invention relates to a farm implement of the type to be mounted on a tractor. More particularly this refers to an improvement on a tractor-mounted cultivator.

Typical of the present day tractor-mounted cultivator is that shown in U.S. Patent 2,423,148 issued to T. W. Johnson. In this type of cultivator there is normally provided a pair of vertical pivots at the forward end and at opposite sides of the tractor body. Structures carrying the left- and right-hand sections of a cultivator are connected to each of the pivots respectively and extend rearwardly and outwardly from the pivots to opposite sides of the tractor body. Conventionally there is provided a connection between the structures carrying the cultivator sections and the tractor body at a distance spaced fore-and-aft from the vertical pivots. Consequently the cultivator is mounted by structure at the forward end of a tractor and also by structure at the side of the tractor. In mounting the cultivator on a tractor, the shovels, stands, or similar ground engageable portions on the cultivator are locked in a position where they engage the ground and the cultivator sections are outwardly of the forward pivots in a position permitting a forward moving tractor body and particularly the front wheels of the tractor to move between the sections of the cultivator. Upon the front end of the forwardly moving tractor contacting the structure supporting the vertical pivots, the cultivator sections will swing inwardly. The structure supporting the vertical pivots is then connected to the tractor and the connections between the sections and the tractor body are then made. In dismounting the cultivator sections from the tractor, the sections are first swung outwardly from the tractor body and the tractor is then backed from between the sections. The necessity of having the cultivator sections outwardly of the tractor body prior to both mounting and dismounting the sections is that in normal operation of the cultivator, there will be provided a pair of shovels directly rearwardly of the front wheels of the tractor (assuming for the time being that this is a tricycle type tractor) which obviously would interfere with the tractor wheels should mounting or dismounting occur prior to the sections being moved.

Movement of the cultivator sections outwardly of the tractor body has in the past been done manually. In the past the use of a two- or four-row cultivator was common, and also due to the limited power and load carrying capacities of the tractors, the cultivators were necessarily light and could be swung on the forward vertical pivots without too much difficulty or strain on the operator. However, with the advent of the larger tractors and with the continued emphasis on large scale farming, cultivators are structurally built to withstand deeper penetration and six row cultivators of this type are becoming more and more common place with even larger cultivators being contemplated. The combination of these two factors have therefore increased the overall weight of the cultivator sections so that it is difficult if not impossible for one man to move the sections laterally to be attached or detached from the tractor body. Consequently, it is becoming more and more apparent that the power source on the tractor is or will be required to move these sections.

It is therefore the primary object of this invention to provide attachment means for mounting the cultivator sections on the tractor which will not require manual labor in attaching or detaching the sections and which will use the power of the tractor for moving the sections both inwardly and outwardly relative to the tractor.

It is also an object of this invention in the above contemplated attachment structure to provide a simple device which will restrict or limit rearward movement of the tractor relative to the forward pivots until the cultivator sections have been driven spacedly outward from the sides of the tractor and clear of the front wheels.

It is also an object of the invention to also provide means for detachably connecting the structure carrying the pivots at the forward end of a tractor to the tractor body in such a manner that movement of the sections outwardly from the body will automatically release the means upon the cultivator sections moving outwardly, and which will automatically connect the structure to the forward end of the tractor upon the sections being moved inwardly into operating position.

Other objects and advantages of the present invention will become apparent to those skilled in the art as the nature of the invention is better understood from the following detailed description as shown in the accompanying drawings.

Fig. 1 is a side view of the forward portion of a tractor with a tractor-mounted cultivator mounted thereon.

Fig. 2 is a sectional view taken along the line 2—2 of Fig. 1.

Fig. 3 is a sectional view taken along the line 3—3 of Fig. 2.

Fig. 4 is a side view of the forward end of a tractor and part of a cultivator supporting structure and featuring a modification of the invention.

Fig. 5 is a sectional view taken along the line 5—5 of Fig. 4.

Fig. 6 is a sectional view taken along the line 6—6 of Fig. 4.

Fig. 7 is a sectional view taken along the line 7—7 of Fig. 5.

Fig. 8 is a sectional view taken along the line 8—8 of Fig. 4.

Fig. 9 is a view similar to Fig. 8, but showing the structure in a different position.

Referring first to the form of the invention shown in Figs. 1–3, the tractor 10 is of a tricycle type, having a fore-and-aft elongated body 11 supported at its forward end by a wheel assembly, indicated in its entirety by the reference numeral 12 and at its rear end by a pair of transversely spaced apart rear traction wheels, not shown. A conventional steering column 13 is provided between the tractor body 11 and the wheel assembly 12 for the obvious purpose of permitting the tractor to be guided over the fields. The tractor body is characterized by having a pair of left- and right-hand structural frames 14, 15 running lengthwise and on opposite sides of the tractor. The frames 14, 15 may be an integral part of the tractor frame or may be attachments rigidly connected to the tractor. For purposes of the present invention the structural frames 14 and 15 are shown as attachments and are connected to the bottom of the tractor frame by means of a cross brace 16, suitable apertures being provided to receive connecting bolts 22. Provided at the upper forward end of the tractor body 11 is a rigid cross piece fixed to the frame of the tractor. Surrounding the steering column 13 is a rigid housing block 18, details of which are unimportant other than that the block has an upright front face 19 on which an upright frame structure 20 may be connected. It may be noted from Fig. 2 that the front frame structure 20 is a continuation of the side frame structures 14 and 15. Fixed to the front surface of the front frame structure 20, by welding or other suitable means is a forwardly projecting V-shaped guide member 21 the purpose of which will later become apparent.

The cultivator is composed of left and right sections 26, 27, positioned respectively to the left and right of the tractor body 11. The sections 26, 27 are comprised of transverse tool bars 28, 29 respectively which operate as main supports for the cultivator tools. The inner end of the tool bars 28 and 29 are rigidly fixed to fore-and-aft extending frame structure or channel members 30, 21. The left channel member 30 is composed of upper and lower lateral leg or flange portions 32, 33 respectively interconnected at their outer edges by an upright web portion 34. The right frame structure 31 is composed of upper and lower laterally extending leg or flange portions 35, 36 interconnected at their outer edges by an upright web portion 37. Inner and outer cultivator shovel assemblies 38 and 39 to the left of the tractor body and 40 and 41 to the right of the tractor body are supported on the left- and right-hand tool bars 28 and 29 respectively by means of parallel linkages extending from the tool bar to the shovel assemblies. The parallel linkages are identical and, as shown in Fig. 1, each is composed of upper and lower parallel links 42, 43 respectively pivotally connected at their forward end by an upright bracket 44, which is fixed to the tool bar 28, and at their rear ends to an upright bracket 46 which has its lower end fixed to a respective shovel assembly.

Rockshafts 50, 51 are carried on the tool bars 28, 29 by means of upright brackets, as at 52, which permit rotation of the rockshafts about a horizontal axis. Rock arms 54, 55 are mounted on the respective rockshafts 50, 51 and are rocked by force transmitting arms 56, 57 which in turn are operated from the operator's station, not shown, of the tractor. Linkage, as at 58, connects the rockshaft 50 to the lower link 43 of the parallel linkage and is responsive to adjustment of the force transmitting arms 56 or 57, as the case may be, to raise or lower the cultivator assemblies. A spring cushion, as at 59, is provided in each of the linkages 58. The shovels, tool standards, and other details of the cultivator sections are unimportant for purposes of this invention other than to note that generally the shovels are spaced outwardly from the tractor body with also a part of each of the sections, here in the form of a ground-engaging portion or shovel being in fore-and-aft alignment with the front wheels, thereby making it impossible for the tractor to pass between the sections unless the sections are first moved laterally outwardly from the tractor. More specific details of the tractor and the cultivator can, if desired, be obtained by referring to the aforesaid Johnson patent.

Frame structure, part of which is the fore-and-aft extending channel members 30, 31, is provided at the forward end of the tractor and form transversely spaced vertical pivots on which the sections may be swung between a position substantially adjacent to the sides of the tractor and a position in which the sections are spacedly outward of the tractor sides. Specifically this structure comprises a transverse shaft 65 positioned to fit into the bight end of the V-shaped guide 21, and a pair of vertical shafts 66, 67 respectively which are fixed to opposite ends of the transverse shaft 65 and to the opposite end of an arcuate channeled member 68 which is normally positioned directly forwardly of the structural cross piece 17 at the upper and forward end of the tractor. As may be noted in Fig. 2 the shaft 66, 67 provides vertical pivots at opposite sides of the tractor on which are mounted the fore-and-aft extending channels 30, 31 respectively. A pair of struts 69, 70 extend from the vertical shaft 66 to the left end of the tool bar 28 and operate to reenforce the outer end of the tool bar 28 against vertical as well as fore-and-aft movement. A similar pair of struts, the lower one 71 of which is shown in Fig. 2, serve a similar purpose relative to the right section of the cultivator.

A bolt 72 extends from the cross piece 17 through the upper transverse channel member 68 and is provided with a nut 73 for securing the frame structure to the forward end of the tractor.

Details of the means for moving the sections laterally when the tractor is moved rearwardly relative to the cultivator is shown generally in Figs. 2 and 3. The structure therein shown relates specifically to that shown on the left-hand side of the tractor and consequently with the left section of the cultivator. It should here be noted that the structure used on the left side is identical to that on the right with the obvious exceptions of the changes required due to the reversal of positions. Consequently details of the structure at the right side of the tractor for moving the cultivator outwardly will be omitted.

The channel member 30 is provided at its rear end with an upright plate 80 fixed to the upper and lower legs or flanges 32 and 33. On the inner surface of the plate 80 is fixed an inwardly extending cone shaped lug 81 which is receivable in an opening 82 in the structural side frame 14 of the tractor. It will be noted that the vertical pivot shaft 66 is substantially fore-and-aft of the supporting structure 14 and consequently the lug 81, unless otherwise restricted, may move in or out of the opening 82, thus permitting swinging of the entire section 26 of the cultivator inwardly or outwardly. A bolt 83 and nut 84 extends through suitable apertures in the frame structure 14 and the upright web portion 34 of the channel member 30, the bolt and nut serving to detachably connect the channel to the tractor body.

A forwardly extending arm member 85 is mounted on the channel member 30 by a vertically disposed bolt 86 which extends between the upper and lower legs 32, 33 respectively and has mounted thereon a hub portion 87 of the arm member 85. The bolt 86 therefore serves as a vertical pivot for permitting lateral swinging motion of the arm member 85. The structural member 14 is recessed inwardly, as at 88, and provides a forward upright transverse surface 89 facing rearwardly for engaging the forward end of the arm member 85. The surface 89 may be considered as arm engaging means since the arm member 85 would normally slide against the fore-and-aft extending surface of the recess 88 until it reaches the end 89 of the recess. A spring 90 extends between the hub 87 and the upright portion 34 of the channel member and operates to normally bias the arm member 85 to a forwardly and inwardly extending position, substantially as shown in Fig. 2.

Assuming for the moment that the cultivator is mounted on the tractor, as shown in Figs. 1 and 2, it may be dismounted in the following manner. The cultivator shovels are first locked in their ground engaging positions, and the force transmitting members 56 and 57 are disconnected from the tractor. The nuts 73, 84, and its counterpart on the right side of the tractor body, are disconnected and the respective bolts removed. At this point, in past operation it would be necessary for the operator to manually lift the cultivator sections and to move them laterally outwardly so that the inner cultivator shovels would be clear of the front wheels. With the present invention, the operator will remount the tractor and drive it rearwardly. As mentioned previously, the cultivator shovels are generally outward of the shafts 66, 67 and consequently the line of resistance created by the cultivator shovels is outward of the shafts 66 and 67. Therefore as long as there is a connection between the pivot shafts 66 and 67 and the tractor, rearward movement of the tractor will cause the cultivator sections to swing outwardly. Following initial rearward movement of the tractor the lugs 81 will leave their respective openings 82. At this point the forward end of the arms 85 will have contacted the surface 89 of the recesses 88. This will offer in the first instance a restriction to limit rearward movement between the tractor and the vertical pivots 66 and 67 until the cultivator shovels are clear of the tractor and in the second instance will operate to drive the cultivator sections outwardly from the tractor body. In either instance, or upon either theory, the forward wheels of the tractor will not reach a position transverse to the cultivator shovels until the sections are well clear of the wheels. Fig. 2 shows in dotted representation the channel members in their maximum outward position.

Upon the tractor moving rearwardly and clear of the cultivator the spring 90 will operate to swing the arm members 85 again forwardly. A similar reaction will occur on the right hand member 31. Therefore, upon driving into the cultivator the arms will be clear to permit entrance without offering a restriction or interference to the tractor. In a manner already shown and described in the aforesaid Johnson patent, forward movement of the tractor relative to the cultivator sections will cause the sections to swing inwardly where they may again be detachably connected by the bolt and nut combinations 72, 73; 83, 84; and its counterpart on the right of the tractor body.

In the modification shown in Figs. 4–9, identical parts as well as substantially identical parts as those in Figs. 1–3, will be given the same reference characters for purposes of clarity. In the modification, the cultivator sections are swung about a single vertical shaft 100 centrally positioned at the forward end of the tractor. The cultivator sections are mounted on the vertical shaft 100 by means of frame structure composed of a pair of lower channel members 102, 103 which extend around the forward end of the tractor with a portion alongside frame structures 14, 15 at the sides of the tractor. A lower strut 104 connects the outer end of the tool bar 28 to the channel member 102. An upper strut member 105 connects the outer end directly to the vertical shaft 100. Connecting the outer end of the right tool bar 29 is a similar pair of struts 106 and 107 respectively. The supporting structure will therefore operate to swing the cultivator sections 26, 27 laterally about the forward central pivot axis of the shaft 100. Lugs 108 and 109 are provided on the members 102, 103 and operate in a manner similar to the lugs 81, of the previously described form of the invention. Bolts and nuts, as at 83, 84, are also provided to detachably connect the fore-and-aft sections of the members 102, 103 to the respective frame structure 14, 15 at the side of the tractor body.

The vertical shaft 100 is connected to the forward end of the tractor body in the following manner. Plate members 110, 111 are fixed to the upper struts 105, 107 respectively and are pivoted on the shaft 100. Fixed to the forward end of the tractor is a frame structure 112, at the forward end of which is fixed a rigid upright shaft 113. The plates 110, 111 are provided with adjoining edges which have notches 114, 115 therein to partially surround the shaft 113. As shown in Figs. 8 and 9, the notches 114, 115 cooperate to grip the shaft 113 when the upper struts 105, 107 are swung rearwardly. The struts 105, 107 are in their rearward position when the cultivator sections 26, 27 are positioned in their operating positions and the plates 110, 111 are held in the gripping position by means of a bracket member 116 having a depending portion 116a which will pass through apertures 117, 118, which are in vertical registered alignment when the notches 114, 115 surround the shaft 113.

The lower end of the shaft 100 is fixed to the forward end of the tractor by means of a socket member 130 which is bolted to the forward vertical surface of steering housing block 18. The socket member is hollowed as at 131 to receive the forward end of a bayonet type member 132 which is mounted on the shaft 100 by means of a hub portion 133. As shown in Fig. 7 the laterally extending leg or flange portions of the channel members 102, 103 overlap at the vertical shaft 100 with the flange of the member 103 lying adjacent to opposite ends of the hub 133. Welded to the outer and front surface of the hub 133 is a T-shaped rigid stop member 134. The opposite ends of which engage the channel members 102, 103 when the cultivator sections are at their laterally outward positions and obviously serve as a stop. The forward end 135 of the hollowed portion is flared radially in a cone shape and the rear end 136 of the bayonet member 132 is cone shaped, both the cone shaped end 136 and cone shaped opening 135 cooperating to guide the bayonet member 132 into the socket member 130.

The lower end of the shaft 100 is held on the forward end of the tractor by means of a latch 140 pivotally mounted on the shaft to permit lateral swinging motion. The rear end of the latch 140 is notched as at 141 to form a hooked end. Depending from the outer surface of the socket member 130 is a bolt 142, the head of which is spaced from the lower surface of the socket. Viewing Figs. 6 and 7, the bolt is positioned relative to the latch 140 so that when the bayonet member 132 is seated in the socket 130 the notch 141 will be in lateral alignment with the bolt and may consequently engage the bolt 142 to prevent separation of the bayonet member 132 from the socket member 130. The notch 141 is opened from its left edge and consequently the latch may be swung to the right but is limited in its leftward movement by the bolt 142. A connecting member 143 made of high quality spring steel extends from the latch member 140 to the right channel member 103. As shown in Fig. 6 the spring 143 is compressed when the channel member 103 lies alongside the frame structure 15 on the tractor body and will therefore act to bias the latch 140 into locking position relative to the bolt 142.

The modification of the invention shown in Figs. 4–9 operate in the following manner. Again assuming that the cultivator is connected to the tractor i.e., the upper connection is as shown in Fig. 8, the lower connection between the shaft 100 and the tractor body is as shown in Figs. 5, and 6, and the channel members 102, 103 are bolted to the frame structures 14, 15. In order to back the tractor from the cultivator the nut 84 and its counterpart on the right side of the tractor must first be removed and the bracket 116 raised so that its depending portion 116a is removed from the apertures 117 and 118 to permit lateral swinging of the cultivator sections about the axis of the vertical shaft 100. With the nuts and the bracket removed, the only restriction against relative fore-and-aft movement between the tractor and the cultivator is the latch 140 which holds the bayonet member 132 in the socket member 130. As in the previous form of the invention the line of resistance of the cultivator shovels against rearward movement is outboard of the tractor body and consequently rearward movement of the tractor will cause the cultivator section to swing outwardly about the axis of the shaft 100. Again viewing Figs. 5 and 6, lateral movement of the right cultivator section 27 and its respective channel support 103 will cause the spring connection 143 to first straighten out and then operate to pull the latch 140 clear of the bolt 142. Consequently upon the channel members 102, 103 reaching the position shown in dotted representation in Figs. 5 and 6 the latch 140 will be clear of the bolt 142 and the tractor may then move rearwardly relative to the cultivator. However, at this position the cultivator shovels or other parts normally in fore-and-aft alignment with the front wheel assembly 12 will then be outward of the body assembly to permit unobstructed backing of the tractor.

When it is desired to mount the cultivator on the tractor; the tractor is driven forwardly between the sections to cause the bayonet member 132 to enter the socket member 130. Upon continued forward movement of the tractor the sections of the cultivator will swing inwardly about the upright shaft 100, the plate member 110, 111 will engage the rigid shaft 113 and the latch member 140 will again position itself in a locked position relative to the bolt 142. The bracket member 116 may then be moved to permit its depending portion 116a to drop into the registered apertures 117, 118 and the nuts 84 may again be replaced to lock the respective channel members 102, 103 against the frame structures 14, 15 on the tractor body.

While only one modification of the invention has been shown it should be recognized that other forms and variations could exist without departing basically from the broad general principles herein claimed. It should therefore be understood that while the preferred embodiments of the invention have been described with the view of clearly and concisely illustrating its principles, it is desired not to so limit or narrow the invention beyond that which is claimed.

What is claimed is:

1. In a tractor-mounted cultivator in which the tractor has a longitudinally extending body including left- and right-hand frame structure at opposite sides thereof, and the cultivator includes a pair of sections mounted on the left and right side respectively of the tractor body, said sections including left- and right-hand frame structure adapted to be detachably connected to the left- and right-hand frame structure respectively of the tractor, said sections being also detachably connected to the tractor body by vertical pivot means permitting the sections to swing between positions proximate to the tractor body and positions spacedly outward from the tractor body, the improvement comprising: a pair of arm members between the left- and right-hand frame structure of the tractor and the corresponding frame structure of the sections and normally lying in fore-and-aft disposition when the frame structure of the tractor body and of the sections are connected; arm connecting means pivotally mounting each of the arm members on each of one of the left- and right-hand frame structure to permit the arm members to swing about a vertical axis; and means forming arm engaging surfaces on each of the other of the left- and right-hand frame structure, said arm members and arm engaging surfaces cooperating upon relative fore-and-aft movement between the cultivator and the tractor to cause the arm members to drive the cultivator sections outwardly.

2. Attachment means for mounting an implement on a tractor having a longitudinal extending tractor body, having fore-and-aft extending side structure thereon comprising: structure forming vertical pivot means connectible to the tractor body; an elongated supporting structure connected to said implement and having one end mounted on the pivot means and extending therefrom adjacent the side structure of the tractor, said supporting structure thereby being adaptable to swing the implement between a position proximate to the tractor body and a position spacedly outward from the tractor body; and a laterally swingable rigid member between the side structure on the tractor and the supporting structure operative in response to fore-and-aft movement of the tractor relative to the implement to effect movement of the implement outwardly from the tractor body.

3. In a tractor-mounted implement in which the tractor has a longitudinally extending body including a fore-and-aft extending structure member at one side thereof, and the implement includes a fore-and-aft extending structure member adapted to be detachably connected to the structure member of the tractor, said implement structure member being also detachably connected to the tractor body by vertical pivot means permitting the implement to swing between a position proximate to the tractor body and a position spacedly outward from the tractor body, the improvement comprising: an arm between the structure member of the tractor and the structure member of the implement normally lying in fore-and-aft disposition when the structure members are connected; arm connecting means pivotally mounting the arm on one of the structure members to permit the arm to swing about a vertical axis; and means forming an arm engaging surface on the other of the structure members, said arm and arm engaging surface cooperating upon a fore-and-aft movement between the implement and the tractor to drive the arm laterally to effect movement of the implement outwardly.

4. In a tractor-mounted implement in which the tractor has a longitudinally extending body including a fore-and-aft extending structure member at one side thereof, and the implement includes a fore-and-aft extending structure member adapted to be detachably connected to the structure member of the tractor, said implement structure member being also detachably connected at its forward end to the tractor body by vertical pivot means permitting the implement to swing between a position proximate to the tractor body and a position spacedly outward from the tractor body, the improvement comprising: an arm between the structure member of the tractor and the structure member of the implement normally lying in fore-and-aft disposition when the structure members are connected; arm connecting means pivotally mounting the arm on one of the structure members to permit the arm to swing about a vertical axis; and means forming an arm engaging surface on the other of the structure members, said arm and arm engaging surface cooperating upon relative rearward movement of the tractor to drive the arm outwardly to cause the arm to effect movement of the implement outwardly.

5. A tractor-mounted implement in which the tractor has a longitudinally extending body including a structure member at one side thereof, and the implement includes a structure member closely proximate to the structure member on the tractor body and detachably connected to the structure member on the tractor, said implement structure member being also detachably connected to the tractor body by vertical pivot means permitting the implement to swing between a position proximate to the tractor body and a position spacedly outward from the tractor body, one of said structure members having an upright faced surface; and a rigid part pivotally mounted on the other structure member operative upon relative fore-and-aft movement between the implement and tractor to engage the faced surface of said one structure member to effect movement of the implement outwardly from the tractor.

6. In a drive-in drive-out type of tractor mounted implement in which the tractor has a longitudinally extending body and the implement includes means for detachably mounting it to one side of the tractor body and means permitting the implement to be moved laterally relative to the tractor body, the improvement comprising: a structure member mounted on the tractor body; a structure member mounted on the implement, one of said structure members having an upright faced surface; an arm pivotally mounted to swing laterally on the other structure member engageable with the upright surface and operative in response to relative movement fore-and-aft between the tractor and implement to effect movement of the implement laterally outwardly of the tractor.

7. Attachment means for a tractor-mounted implement in which the tractor has a longitudinally extending tractor body supported on front and rear wheel assemblies, and the implement has a ground engaging portion outboard of the tractor body and a part thereof normally in fore-and-aft alinement with the front wheel assembly, said attachment means comprising: structure forming vertical pivot means at the forward end of the tractor body inboard of the ground engaging means, said structure also including an elongated frame member connected to the implement and having a forward end connected to the pivot means, said structure cooperating with the ground engaging portion to operate upon rearward movement of the pivot means to swing the implement laterally from a first position in which said part is in fore-and-aft alignment with the front wheels to a second position in which said part is outboard of the wheels thereby permitting the tractor to back unrestrictably from the vicinity of the implement; means for detachably connecting the structure to the tractor body; restriction means between the structure and the tractor body operative to limit rearward movement of the tractor relative to the implement; and means on the structure connected to said restriction means responsive to said implement moving from the first to the second position to automatically release the restriction means upon the implement reaching said second position.

8. The invention defined in claim 7, in which the means for moving the implement outwardly from the side structure on the tractor comprises an arm member mounted on the supporting structure for movement about a vertical axis and extending forwardly; and arm engaging means on the tractor body operative to engage the arm member for causing the arm member to swing inwardly relative to the tractor when the tractor moves rearwardly thereby driving the structure outwardly from the tractor body.

9. The invention defined in claim 7, in which the restriction means is characterized by a socket member mountable on the forward end of the tractor, a member receivable by the socket member mounted on the structure, a releasable locking element between the members for preventing separation thereof; and means extending from the locking element to the implement operative to release the locking element upon the implement approaching said second position in its lateral swinging motion.

10. The invention defined in claim 7, in which the restricting means is in the form of a pair of cooperating members, one mounted on the tractor body and the other mounted on the structure, and a locking element between the members for connecting the members together, and means extending from the locking element to the implement operative to release the locking element upon the implement approaching said second position in its lateral swinging motion.

11. The invention defined in claim 10, in which the means extending from the locking element to the implement includes biasing means for automatically causing the element to reposition itself to connect the members together when the implement moves to its first position.

12. The invention defined in claim 7, in which the restriction means comprises an arm member vertically pivotally mounted on the structure and extending forwardly; arm engaging means on the tractor body positioned to engage the arm member upon rearward movement of the tractor relative to the implement and operative to drive the implement outwardly upon such movement, said arm member being released from the arm engaging means upon the implement reaching said second position.

13. The invention defined in claim 12, further characterized by biasing means between the arm member and the structure for repositioning the arm member in its forwardly extending direction upon the arm being released from the arm engaging means.

14. In a tractor-mounted cultivator in which the tractor has a longitudinally extending body and the cultivator includes a pair of sections mounted on the left and right side respectively of the tractor body, said sections including left- and right-hand structure adapted to be detachably connected to the respective side of the tractor, the improvement comprising: structure forming a central upright pivot at the forward end of the tractor, means mounting the left- and right-hand frame structure on the pivot to permit the sections to swing between positions proximate to the tractor body and positions spaced outward from the sides of the tractor body, an upright rigid element on the forward end of the tractor, a pair of plate members fixed respectively to the left- and right-hand frame structures, each of the plates having a notched edge for receiving the rigid element upon its respective section being swung proximate the tractor body, both of said plates cooperating together to grip the rigid element to prevent separation of the left- and right-hand frame structure from the tractor body at that point, releasable means locking the plate members against movement out of their element gripping positions, and restriction means between the frame structure and the tractor body operative to limit rearward movement of the tractor body relative to the implement until the implement sections are in a position spacedly outward of the tractor body.

15. In a tractor-mounted cultivator in which the tractor has a longitudinally extending body and the cultivator includes a pair of sections mounted on the left and right side respectively of the tractor body, said sections including left- and right-hand structure adapted to be detachably connected to the respective side of the tractor, the improvement comprising: structure forming a central upright pivot at the forward end of the tractor, means mounting the left- and right-hand frame structure on the pivot to permit the sections to swing between positions proximate to the tractor body and positions spacedly outward from the sides of the tractor body, an upright rigid element on the forward end of the tractor, a pair of plate members fixed respectively to the left- and right-hand frame structures, each of the plates having a notched edge for receiving the rigid element upon its respective section being swung proximate the tractor body, both of said plates cooperating together to grip the rigid element to prevent separation of the left- and right-hand frame structure from the tractor body at that point, and releasable means locking the plate members against movement out of their element gripping position.

References Cited in the file of this patent

UNITED STATES PATENTS

| Re. 23,154 | Johnson | Oct. 11, 1949 |
| 2,560,702 | Reaves | July 17, 1951 |
| 2,584,217 | Morkoski | Feb. 5, 1952 |